Dec. 3, 1963 W. R. L. SCHOPPMEYER ETAL 3,112,985
PROCESS FOR THE MANUFACTURE OF PACKAGING MATERIALS
Filed June 23, 1960 3 Sheets-Sheet 3
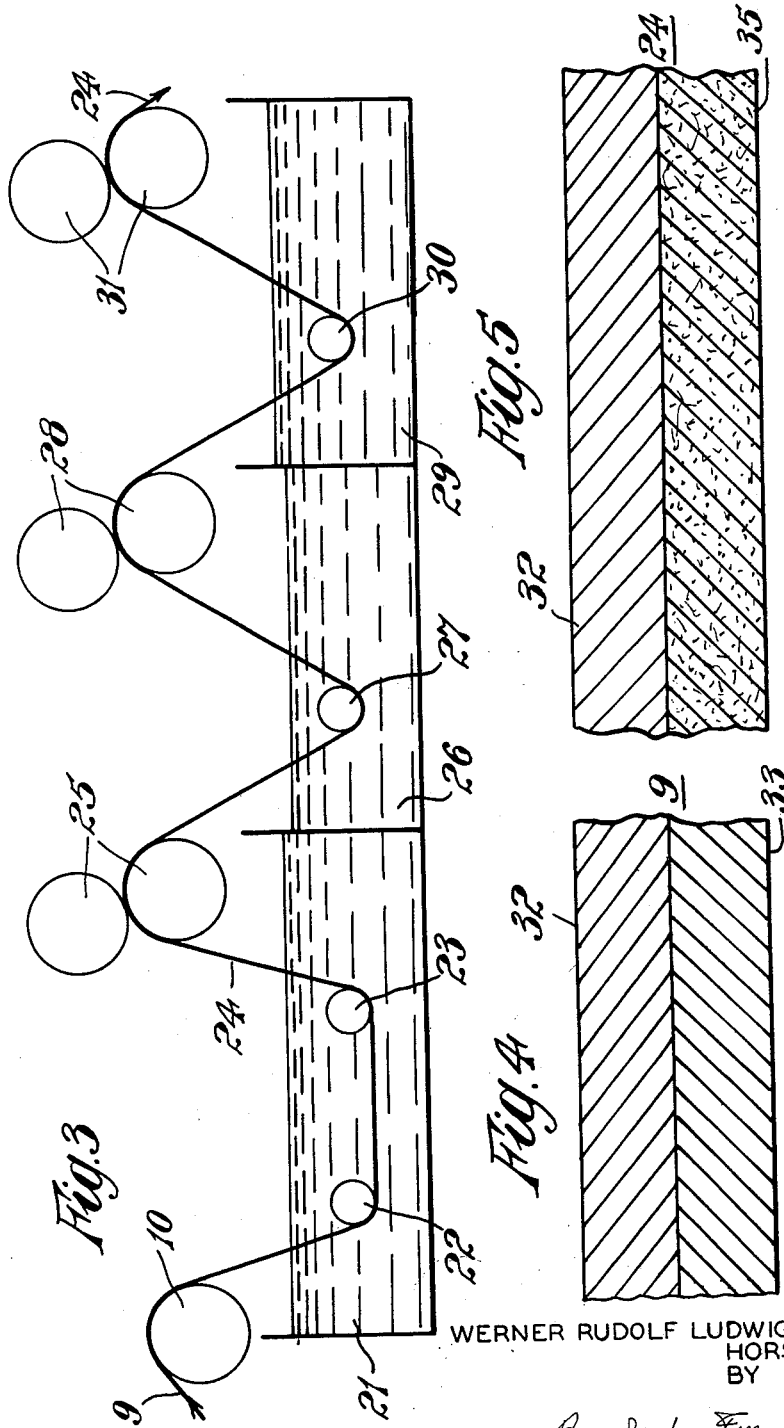
INVENTORS
WERNER RUDOLF LUDWIG SCHOPPMEYER
HORST SCHMIDT
BY
THEIR ATTORNEYS 3,112,985
PROCESS FOR THE MANUFACTURE OF
PACKAGING MATERIALS
Werner Rudolf Ludwig Schoppmeyer and Horst Schmidt, Kempten, Allgau, Germany, assignors to Lever Brothers Company, New York, N.Y., a corporation of Maine
Filed June 23, 1960, Ser. No. 38,207
Claims priority, application Germany June 27, 1959
7 Claims. (Cl. 8—115.6)

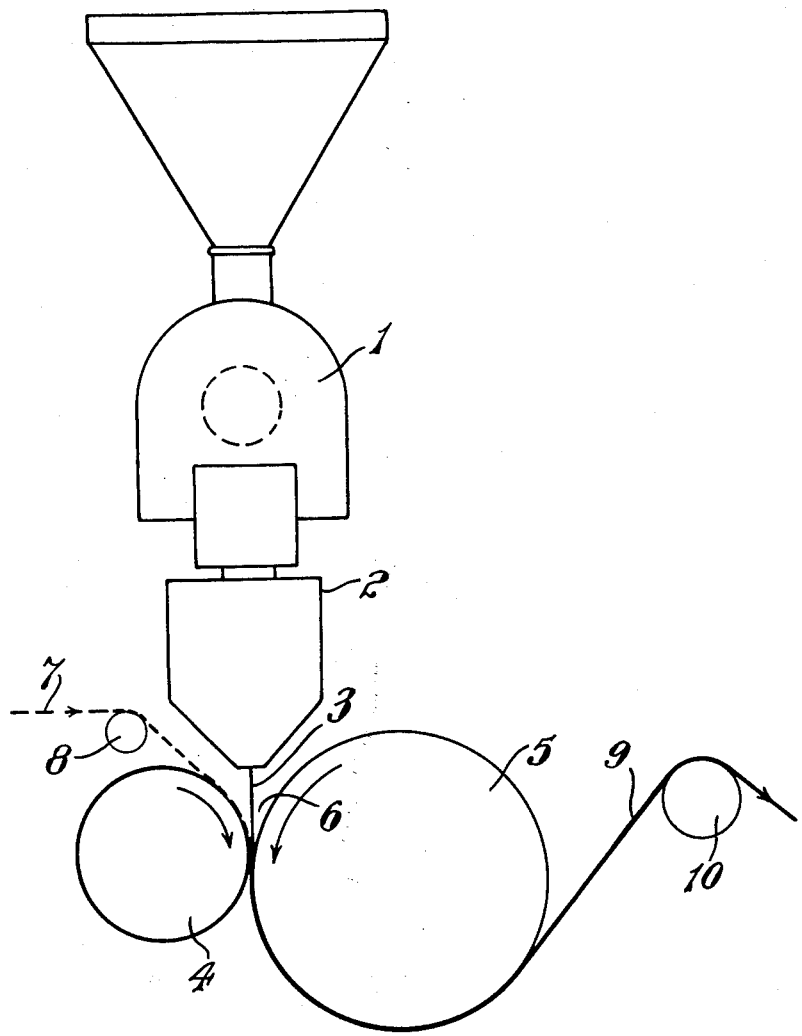

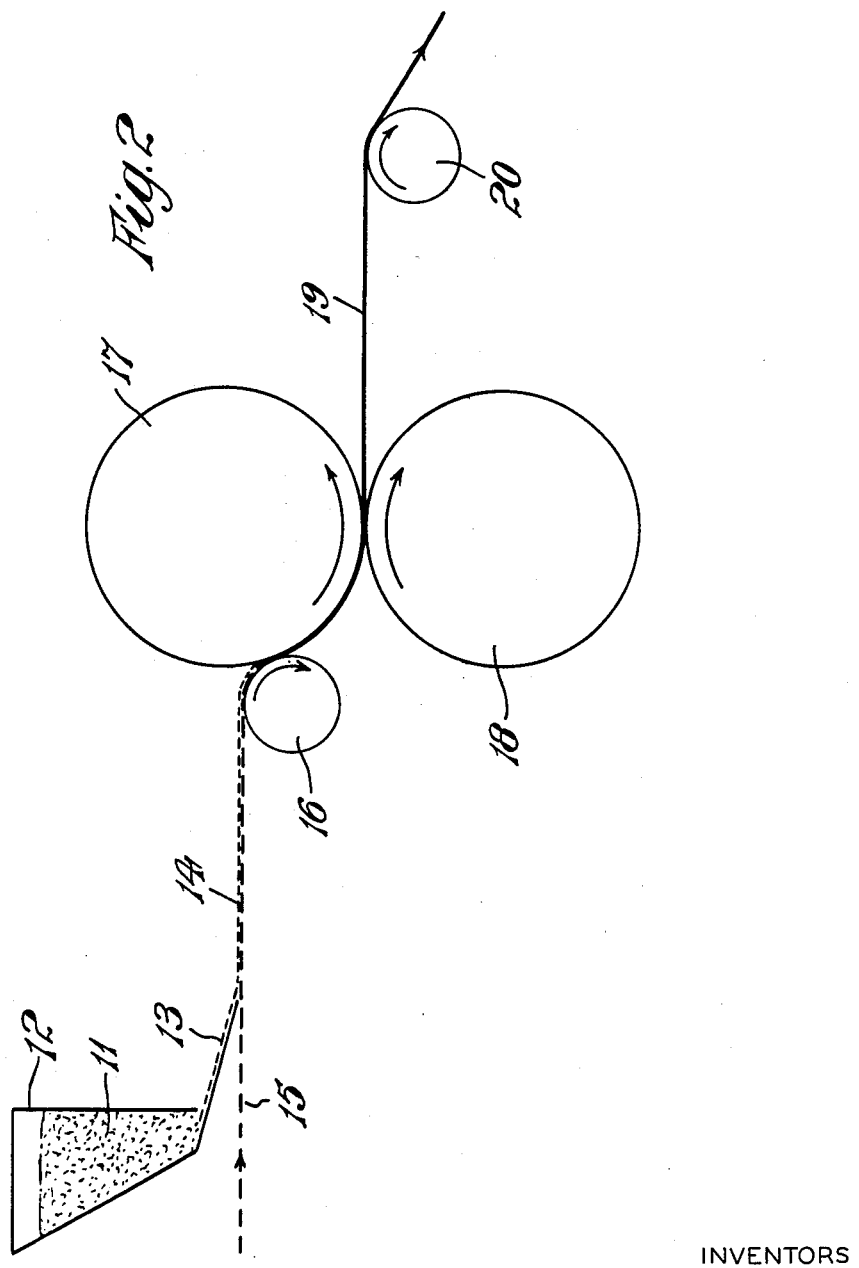

This invention relates to a process for the manufacture of packaging materials and more particularly to the manufacture of packaging materials which are greaseproof and which resist the passage of water-vapour. The invention also concerns packaging materials made by such processes.

According to the invention there is provided a process for the manufacture of a packaging material which comprises the step of: producing on one side of a parchmentisable paper web from synthetic resin in a softened or molten state a film of the resin bonded to the paper web, said film being resistant to the passage of water-vapour and not damaged by the parchmentising medium employed in the subsequent parchmentising step; and passing the resin-coated paper web through a parchmentising medium to parchmentise the paper web. The parchmentisable paper web preferably has a weight of not more than 30 grams per square metre, for example 20 to 30 grams per square metre.

The synthetic resin is preferably polyethylene but other materials such as polypropylene, polyvinylchloride, polyvinylidene chloride, polyamide, polycarbonate and polystyrene may also be employed.

The resin film may be formed on the paper web by extruding the resin in a softened or molten state through a slot die directly on to the paper web, the resin layer being bonded to the paper web by a suitable treatment such as a pressure treatment. The film can also be produced by evenly distributing thermoplastic synthetic resin in powder form over the paper web and melting and fusing the resin on to the paper web by passing the covered paper web through a pair of rollers at least one of which is heated.

The parchmentisation can be carried out in the usual way using, for example, sulphuric acid as the parchmentising medium. After parchmentisation the strip is washed, neutralised and dried in the normal way.

The resin-coated vegetable parchment packaging material obtained by the process of the invention is ideally suited for the wrapping of water-containing edible fats like margarine and butter. The parchmentisation process imparts the required greaseproofness to the paper and the resin film imparts the desired resistance to the passage of water-vapour through the packaging material. It is known that uncoated vegetable parchment used as a packaging material, while having the requisite property of being greaseproof, it is not impervious to water-vapour and loss of water from water-containing edible fats like margarine and butter is undesirable since it causes darkening of the surface of the fat.

A particular advantage of the process of the invention is that it enables, for what is believed to be the first time, the large scale manufacture of synthetic resin-coated vegetable parchment paper of which the parchment paper may be very thin. The weight per square metre of conventional packaging material is relatively high but the process of the invention now enables the large scale manufacture of resin-coated parchment paper of which the paper layer may have a weight prior to parchmentising of only 30 grams per square metre or less, for example of 20 to 30 grams per square metre. It is very difficult to parchmentise on a large scale uncoated papers of a weight of less than about 40 grams per square metre with the view to subsequently applying a resin film to the parchmentised paper. Such thin papers easily tear during parchmentisation and it is found that after passage through the parchmentising medium, they readily wind themselves around pressure rolls employed in the process, such as the squeezing rolls. Furthermore, when employing paper of sufficient thickness to permit parchmentisation to be effected without encountering the above difficulties, it is necessary in order to join a synthetic resin film to the parchmentised paper, to employ an intermediate adhesive layer to get the best results. By forming the resin film, in accordance with the invention, in a molten or softened state, it can readily be arranged that there is no substantial penetration of the paper web by the resin enabling uniform parchmentisation of the coated paper to be readily effected. This is in contrast to the results obtained when attempts are made to apply the resin film from a solution of the resin in a solvent or from a dispersion of the resin in a dispersing agent when substantial penetration of the solution or dispersion into the paper results giving the practical disadvantage that subsequent uniform parchmentisation of the paper fibres is hindered by the absorbed resin; this disadvantage is most manifest when thin paper webs are used. Such a process involving a solution or dispersion would have the further undesirable feature of requiring an additional operating step, namely that of removing the solvent or dispersing agent from the impregnated paper.

The use of thermoplastic synthetic resins is especially advantageous for some packaging applications as they can be readily sealed. Thus vegetable parchment coated with synthetic resin can be readily joined to other materials by heat-sealing techniques. Examples of such materials are paper and aluminium foil.

An embodiment of the invention will now be described with reference to the accompanying diagrammatic drawings in which:

FIGURE 1 shows a method of producing on one side of a parchmentisable paper web a polyethylene film bonded to the paper web;

FIGURE 2 shows an alternative method of producing on one side of a parchmentisable paper web a polyethylene film bonded to the paper web;

FIGURE 3 shows the polyethylene coated paper web passing through a parchmentising machine to parchmentise the paper web;

FIGURE 4 shows in cross-section the polyethylene coated paper web prior to parchmentisation; and FIGURE 5 shows in cross-section the polyethylene coated paper after parchmentisation.

Referring to FIGURE 1, this shows a conventional extruding machine 1 for extruding polyethylene through a die 2 provided with a narrow slit orifice, to form a molten film 3. A pair of adjacent parallel rolls 4 and 5 rotating in opposite directions as indicated, are positioned below the die 2 so that the molten film 3 travels a short distance substantially vertically to reach the nip 6 of the rolls.

A parchmentisable paper web 7 having a weight of about 24 grams per square metre, to which the film 3 is to be bonded, is supplied over a guide roll 8, partially around the roll 4 and into the nip 6 of the rolls. The web 7 and the film 3 contact each other at the nip 6 of the rolls and are not brought into contact with each other appreciably before that point nor is the film 3 brought into contact with the roll 5 before it reaches the nip 6 of the rolls. Thus, the film 3 and paper web 7 contact each other, are pressed together, and the exposed surface of the film 3 is chilled by the roll 5, all substantially simultaneously. In this way the resin film is solidified and bonded to the paper web without substantial penetration of the resin into the paper web occurring. The resin-coated parchmentisable paper web 9 is then supplied over a guide roll 10 to a parchmentising machine as shown in FIGURE 3.

FIGURE 2 shows an alternative method of producing a polyethylene coated parchmentisable paper web. In this method polyethylene 11 in powder form is fed from a hopper 12 down a chute 13 to form a substantially uniform layer 14 on a paper web 15. The paper web covered with the polyethylene powder is fed between a pair of rolls 16 and 17 partially around the periphery of roll 17 and through the nip of rolls 17 and 18. The roll 17 is heated by means not shown and the polyethylene is melted and fused to the paper web. The polyethylene coated paper web 19 is then fed over the guide roll 20 to the parchmentising machine as shown in FIGURE 3.

FIGURE 3 shows a parchmentising machine to which the polyethylene coated paper 9 of FIGURE 1 (or the polyethylene coated paper 19 of FIGURE 2) is fed over the guide roll 10 (corresponding to the guide roll 20 of FIGURE 2). The coated paper passes into a parchmentising medium 21 of 70% sulphuric acid and passes around the rolls 22 and 23 whence the parchmentised coated paper 24 is fed to a pair of squeezing rolls 25 to remove excess sulphuric acid. The resin-coated parchmentised paper is then supplied to a washing bath 26 containing water, in which bath it passes around roll 27, and then to a further pair of squeezing rolls 28. Finally the coated paper passes into a neutralising solution 29 around the roll 30 and to the final pair of squeezing rolls 31 to remove excess liquid. The resin-coated parchment paper 24 is then supplied to a conventional drier (not shown).

FIGURE 4 represents the resin-coated paper prior to parchmentisation and shows a resin layer 32 bonded to the parchmentisable paper web 33.

In FIGURE 5 the resin-coated parchmentised paper laminate 24 comprises the resin layer 32 bonded to the parchmentised paper layer 35.

By the method described above a packaging material was produced consisting of a very thin web of parchment paper backed by a film of synthetic resin, which parchment paper web was so thin that it could not by itself be parchmentised in the conventional way since it would readily tear and cause other operational difficulties. The packaging material obtained possessed the known good properties of vegetable parchment and, moreover, because of the bonded synthetic resin film, had a high degree of imperviousness to water-vapour. The synthetic resin film also conferred increased wet strength.

What is claimed is:

1. A process for the manufacture of sheet packaging material which is greaseproof and resistant to the passage therethrough of water vapor, which comprises applying a water vapor impervious resinous coating in a soft, flowable state to one surface only of a web of parchmentizable paper, bonding the coating to said one surface without substantial penetration of said resin into said web and then parchmentizing the resin-free surface of said web.

2. A process for the manufacture of sheet packaging material which is greaseproof and resistant to the passage of water vapor therethrough, which comprises producing on one surface only of a parchmentizable paper web, a film-like coating of a synthetic resin in a soft flowable state and of a type which when continuous, inhibits the passage therethrough of water vapor, pressing the coating firmly against said face of said web to obtain firm contact of the coating with the web, hardening the applied coating, and then parchmentizing the coated web.

3. A process as in claim 2 in which the paper web has a weight of not more than 30 grams per square meter.

4. A process as in claim 2 in which the paper web has a weight from 20 to 30 grams per square meter.

5. A process as in claim 2 in which the film-like coating is extruded onto said one surface of the paper web.

6. A process as in claim 2 in which the resin is polyethylene.

7. A process for the manufacture of sheet packaging material which is greaseproof and resistant to the passage therethrough of water vapor, which comprises extruding onto one surface only of a parchmentizable paper web having a weight of not more than 30 grams per square meter, a film-like coating of polyethylene in a soft flowable state, pressing the coating firmly against said face of said web to obtain firm contact of the coating with the web, hardening the applied coating, and then parchmentizing the coated web.

References Cited in the file of this patent

UNITED STATES PATENTS

| | | |
|---|---|---|
| 1,126,783 | Kindleberger | Feb. 2, 1915 |
| 1,465,882 | Tingle | Aug. 21, 1923 |
| 2,739,058 | O'Flynn et al. | Mar. 20, 1956 |
| 2,863,715 | Goldman | Dec. 9, 1958 |